United States Patent
Smith

(10) Patent No.: US 11,441,490 B2
(45) Date of Patent: Sep. 13, 2022

(54) HYDRAULIC BRAKING AND POWER EXTRACTION FOR ROTATIONAL MACHINES

(71) Applicant: Rolls-Royce Corporation, Indianapolis, IN (US)

(72) Inventor: Alan Smith, Greenwood, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 1028 days.

(21) Appl. No.: 16/138,469

(22) Filed: Sep. 21, 2018

(65) Prior Publication Data

US 2020/0099322 A1 Mar. 26, 2020

(51) Int. Cl.
| | |
|---|---|
| *F02C 9/56* | (2006.01) |
| *H02P 9/04* | (2006.01) |
| *F16D 65/833* | (2006.01) |
| *F16D 65/78* | (2006.01) |
| *F16D 57/06* | (2006.01) |

(52) U.S. Cl.
CPC .............. *F02C 9/56* (2013.01); *H02P 9/04* (2013.01); *F05D 2260/904* (2013.01); *F05D 2270/021* (2013.01); *F05D 2270/304* (2013.01); *F16D 57/06* (2013.01); *F16D 65/833* (2013.01); *F16D 2065/787* (2013.01)

(58) Field of Classification Search
CPC ........ F02C 9/56; H02P 9/04; F05D 2260/904; F05D 2270/021; F05D 2270/304; F16D 57/06; F16D 65/833; F16D 2065/787
See application file for complete search history.

(56) References Cited

U.S. PATENT DOCUMENTS

| | | | | |
|---|---|---|---|---|
| 2,988,009 A | * | 6/1961 | Kraissl, Jr. | F04C 2/18 418/206.7 |
| 3,851,463 A | * | 12/1974 | Robinson | F02C 7/36 60/39.282 |
| 3,899,877 A | * | 8/1975 | Flanigan | B60W 10/04 477/30 |
| 3,941,015 A | * | 3/1976 | Robinson | B60K 3/04 477/30 |
| 4,209,979 A | | 7/1980 | Woodhouse | |
| 4,787,332 A | * | 11/1988 | Geisel | G05D 7/0676 118/410 |

(Continued)

*Primary Examiner* — Pedro J Cuevas
(74) *Attorney, Agent, or Firm* — Crowell & Moring LLP

(57) ABSTRACT

A system and method can include a rotational component, a fluid pump, and a shaft transferring rotational power toward the fluid pump. A fluid circuit can include a valve and the fluid pump wherein pump is configured to motivate fluid toward the valve disposed downstream of the pump. The system can be configured to raise fluid pressure at the pump outlet by closing the valve to thereby effect an increased braking load on the shaft. The rotational component can be an electric machine mechanically coupled to a gas turbine engine. The fluid circuit can include a heat exchanger configured to transfer heat between the rotational component and the fluid. The system can include a second heat exchanger configured to transfer heat from the fluid to a heat sink. A processing system can be configured to receive a command to increase the hydraulic braking load to the rotational component by closing the valve to raise fluid pressure at the pump outlet based on a braking command.

18 Claims, 7 Drawing Sheets

(56) References Cited

U.S. PATENT DOCUMENTS

| | | | |
|---|---|---|---|
| 5,358,455 A | 10/1994 | Lundström | |
| 5,967,285 A | 10/1999 | Mohan et al. | |
| 6,578,654 B2 | 6/2003 | Porter | |
| 8,215,437 B2 | 7/2012 | Watson | |
| 9,061,670 B2 | 6/2015 | Strengert | |
| 9,352,743 B2 * | 5/2016 | Davis | B60K 6/12 |
| 9,670,904 B2 | 6/2017 | Warfen | |
| 9,729,096 B2 | 8/2017 | Edwards | |
| 9,919,909 B2 * | 3/2018 | Cohen | F04C 14/06 |
| 2004/0020206 A1 * | 2/2004 | Sullivan | F01C 11/00 60/670 |
| 2010/0021284 A1 | 1/2010 | Watson | |
| 2014/0207350 A1 | 7/2014 | Dix et al. | |
| 2014/0274522 A1 * | 9/2014 | Davis | B60K 6/12 475/2 |
| 2015/0128580 A1 | 5/2015 | Lacher | |
| 2020/0096062 A1 | 3/2020 | Smith | |

* cited by examiner

HYDRAULIC BRAKING AND POWER EXTRACTION FOR ROTATIONAL MACHINES

CROSS-REFERENCE

This application is related to the following copending patent application which is hereby incorporated by reference: U.S. Utility patent application Ser. No. 16/138,532, concurrently filed herewith, entitled: HYDRAULIC BRAKE AND DISCONNECT FOR ROTATIONAL MACHINES, inventor: Alan Smith.

BACKGROUND

Field of the Disclosure

Among other things, the present application discloses braking a rotating component, such as an electrical machine, with a fluid circuit. The fluid circuit can be a cooling circuit.

DESCRIPTION OF RELATED ART

Gas turbine engines can be used to drive an electric generator. The electric generator can supply electrical energy to an electric motor. An electric motor can drive a rotating component; such as fan blades of an aircraft. For example, U.S. Pat. No. 9,729,096 to Edwards discloses an alternating current generator mechanically coupled with a gas turbine engine. Electric motor or generator machines require cooling which can be liquid cooling requiring a cooling fluid circuit with a heat exchanger.

SUMMARY

A system can include a rotational component, a fluid pump, and a shaft transferring rotational power toward the fluid pump. A fluid circuit can include a valve and the fluid pump wherein pump is configured to motivate fluid toward the valve disposed downstream of the pump. The system can be configured to raise fluid pressure at the pump outlet by closing the valve to thereby effect an increased braking load on the shaft. The rotational component can be an electric machine mechanically coupled to a gas turbine engine.

The fluid circuit can include a heat exchanger configured to transfer heat between the rotational component and the fluid. The system can include a second heat exchanger configured to transfer heat from the fluid to a heat sink.

The system can include a second fluid circuit that can include a pump mechanically coupled with the shaft and a hydraulic motor mechanically coupled with the pump of the other fluid circuit.

A processing system can be configured to receive a command to increase the hydraulic braking load to the rotational component by closing the valve to raise fluid pressure at the pump outlet based on a braking command.

A method can include coupling a fluid pump to apply a braking load to a shaft driving a rotational component. The braking load can be applied in relation to the pressure of the fluid in a fluid circuit including the fluid pump. The method can include at least partially closing a valve to thereby raise the pressure within the fluid circuit to effect an increase in the braking load applied to the shaft.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, some Figures omit views of certain features.

DETAILED DESCRIPTION

Illustrative (i.e., example) embodiments are disclosed. The claims are not limited to the illustrative embodiments. Therefore, some implementations of the claims will have different features than in the illustrative embodiments. Changes to the claimed inventions can be made without departing from their spirit. The claims are intended to cover implementations with such changes.

At times, the present application uses directional terms (e.g., front, back, top, bottom, left, right, etc.) to give the reader context when viewing the Figures. Directional terms do not limit the claims. Any directional term can be replaced with a numbered term (e.g., left can be replaced with first, right can be replaced with second, and so on). Furthermore, any absolute term (e.g., high, low, etc.) can be replaced with a corresponding relative term (e.g., higher, lower, etc.).

Figure 1A:
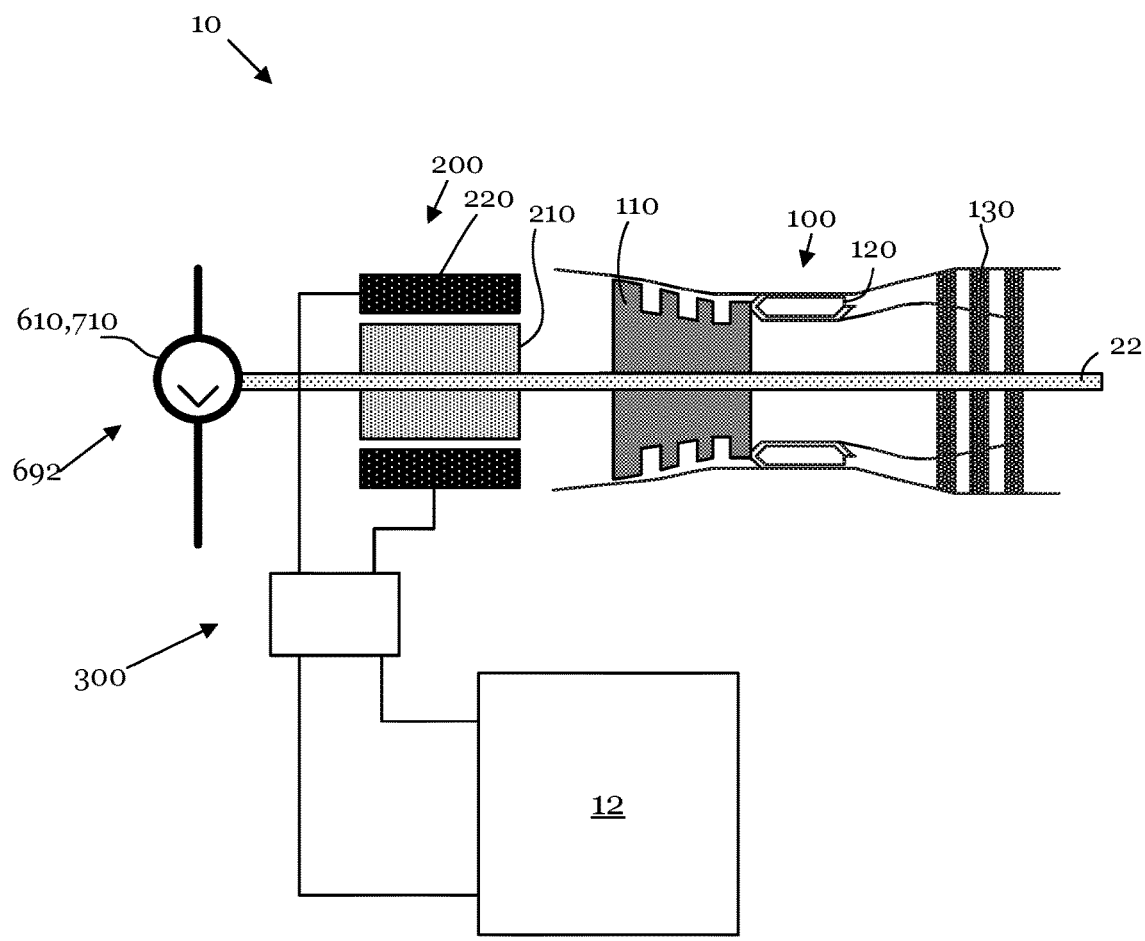
FIGS. 1A and 1B schematically show various embodiments of an exemplary system.
Figure 1B:
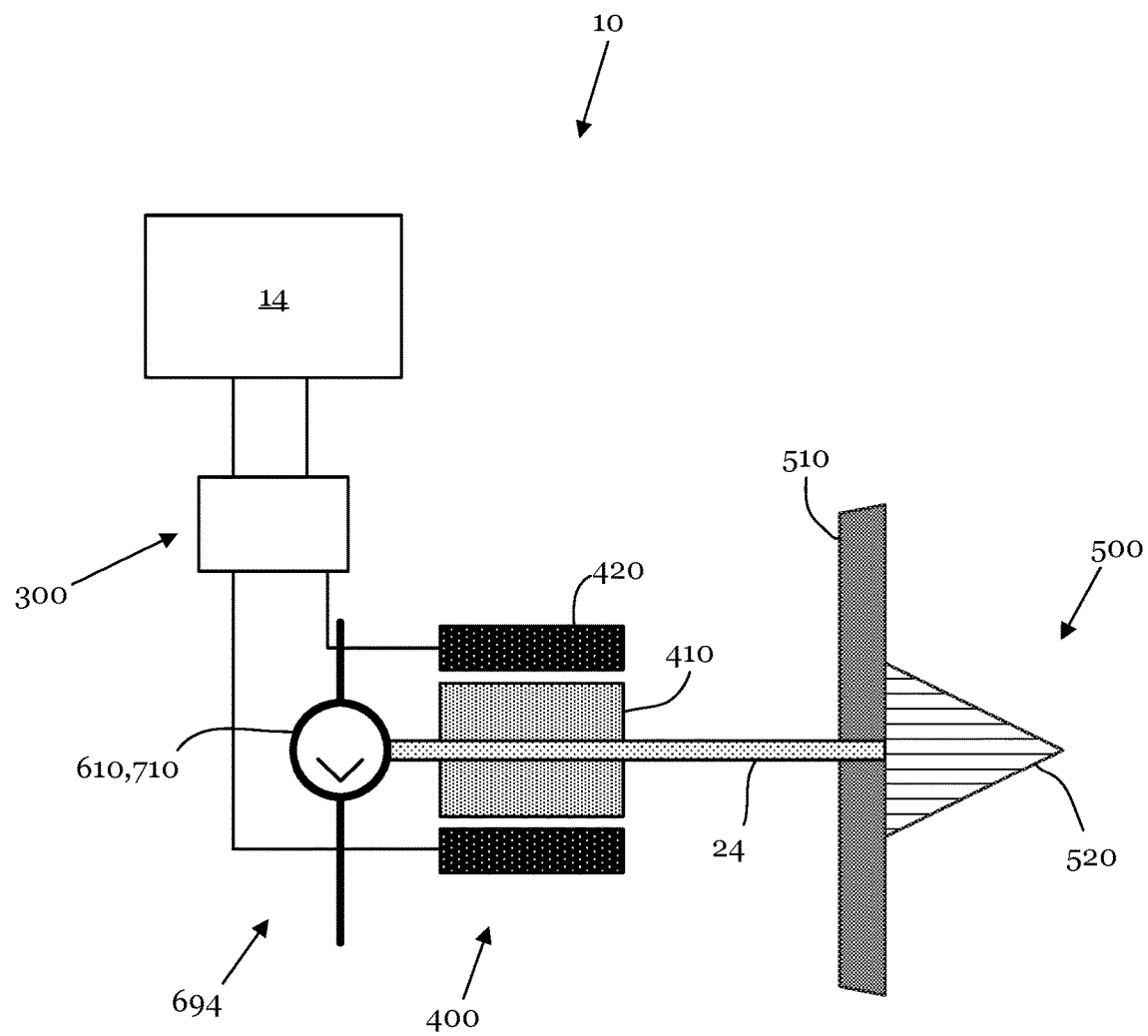

Referring to FIGS. 1A and 1B, system 10 (also called a drive system) can include a gas turbine 100, a first electric machine 200, intermediate circuitry 300, a second electric machine 400, and a fan 500. Each of first electric machine 200 and second electric machine 400 can be configured to function as both an electric generator and an electric motor.

Gas turbine 100 can include a compressor 110 (i.e., a compressor assembly), a combustor 120 (i.e., a combustor assembly), and a turbine 130 (i.e., a turbine assembly). Compressor 110 can pressurize ambient air. Combustor 120 can inject fuel into the pressurized ambient air, then ignite the fuel/air mixture. The combustion products can expand to rotate turbine 130. Both turbine 130 and compressor 110 can be directly attached to a mainshaft 22 (i.e., a first shaft assembly) such that compressor 110 can rotate on mainshaft 22 with turbine 130.

First electric machine 200 can be configured to operate as an electric motor and/or an electric generator. First electric machine 200 can convert mechanical power supplied by gas turbine 100 into electrical power (e.g., alternating current). First electric machine 200 can supply the electrical power to second electric machine 400 via intermediate circuitry 300. First electric machine 200 can convert electric power supplied by intermediate circuitry 300 into mechanical power to drive mainshaft 22, which can assist during startup of gas turbine 100. First electric machine 200 can switch between functioning as an electric generator and an electric motor based on the direction of electric current flow and/or magnitude of applied voltage relative to internally generated voltage or electromotive force.

First electric machine 200 can include a rotor 210 (i.e., a rotor assembly) and a stator 220 (i.e., a stator assembly). One of rotor 210 and stator 220 can include magnets. The other of rotor 210 and stator 220 can act as an armature. Like compressor 110 and turbine 130, rotor 210 can be attached to mainshaft 22 such that turbine 130 transmits rotational power to rotor 210 through mainshaft 22. As with all shafts (i.e., shaft assemblies) discussed herein, mainshaft 22 can be a series of discrete shafts mechanically coupled via one or more transmissions (e.g., gearboxes). For example, a differential gearbox can be disposed along mainshaft 22 between compressor 110 and rotor 210.

Intermediate circuitry 300 can store electric energy and/or convert electric energy into a new state (e.g., convert alternating current into direct current and/or the opposite). Intermediate circuitry 300 can include a plurality electrical components such as batteries, converters (e.g., inverters, rectifiers), and so on.

Second electric machine 400 can function as an electric motor and/or an electric generator. When functioning as an electric motor, second electric machine 400 can receive electrical power from intermediate circuitry 300. When functioning as an electric generator, second electric machine 400 can convert mechanical power present in fan 500 into electric power, which second electric machine 400 can transmit to intermediate circuitry 300 for storage.

Second electric machine 400 can include a rotor 410 and a stator 420. One of rotor 410 and stator 420 can include magnets. The other of rotor 410 and stator 420 can act as an armature. Second electric machine 400 can switch between functioning as an electric generator and an electric motor based on the direction of electric current flow and/or magnitude of applied voltage relative to internally generated voltage or electromotive force.

Rotor 410 can be attached to a fan shaft 24 (i.e., a second shaft). As with mainshaft 22, fan shaft 24 can be an assembly of one or more discrete shafts mechanically coupled through one or more speed reduction gearboxes. Second electric machine 400 can transmit mechanical energy through fan shaft 24 to fan 500. Fan 500 can transmit mechanical power through fan shaft 24 to second electric machine 400 for electric power generation. Therefore, system 10 can be configured to applying a torque load to fan 500 by generating electric power. Fan 500 can include fan blades 510 and a nose cone 520.

Second electric machine 400 can be configured to accept alternating current or direct current. Second electric machine 400 can include a rotor 410 and a stator 420. One of rotor 410 and stator 420 can include magnets. The other of rotor 410 and stator 420 can act as an armature. Rotor 410 can be attached to fan shaft 24. As with mainshaft 22, fan shaft 24 can be an assembly of one or more discrete shafts mechanically coupled through one or more speed reduction gearboxes.

System 10 is not limited to a hybrid aircraft drive. System 10 can be a turbofan, such as a geared turbofan. System 10 can be any kind of vehicle engine, such as an automobile engine. As shown in FIG. 1A, intermediate circuitry 300 of system 10 can provide electric power into any kind of electric power consumer 12 (e.g., an auxiliary electrically powered system, a heater, or a motor for a fluid pump or compressor). As shown in FIG. 1B, intermediate circuitry 300 of system 10 is configured to receive electric power from any kind of electric power supply 14 (e.g., battery, solar panels, micro-grid power system, or a generator powered by a piston-drive internal combustion engine) and second electric machine 400 is mechanically coupled with any kind of rotational device (e.g., aircraft propeller or variable pitch fan, a propeller in a submarine or other marine vessel, a subsequent electric machine, a compressor, a liquid pump, etc.).

System 10 can include a first electric machine ("FEM") fluid system 692 mechanically coupled to mainshaft 22 (and thus driven by turbine 130) and/or a second electric machine ("SEM") fluid system 694 mechanically coupled to fan shaft 24 (and thus driving rotor 410). FEM fluid system 692 and/or SEM fluid system 694 can be any of the fluid systems described herein. For example, FEM fluid system 692 and/or SEM fluid system 694 can be first fluid system 801 as shown in FIGS. 2 and 2A, or a second fluid system 803 as shown in FIGS. 3 and 3A.

Each fluid system 801, 803 can have at least two operational states (further discussed below). In a first operational state, each fluid system 801, 803 can drive a fluid in a loop to perform a cooling function. The fluid can withdraw heat from a heat source, then reject heat into a heat sink. In a second operational state, each fluid system 801, 803 can be configured to provide significantly higher hydraulic braking in order to rotationally decelerate mainshaft 22 or fan shaft 24. The cooling capacity of the fluid circuit 600 can immediately be reduced or eliminated after transitioning to the second state.

Figure 2A:
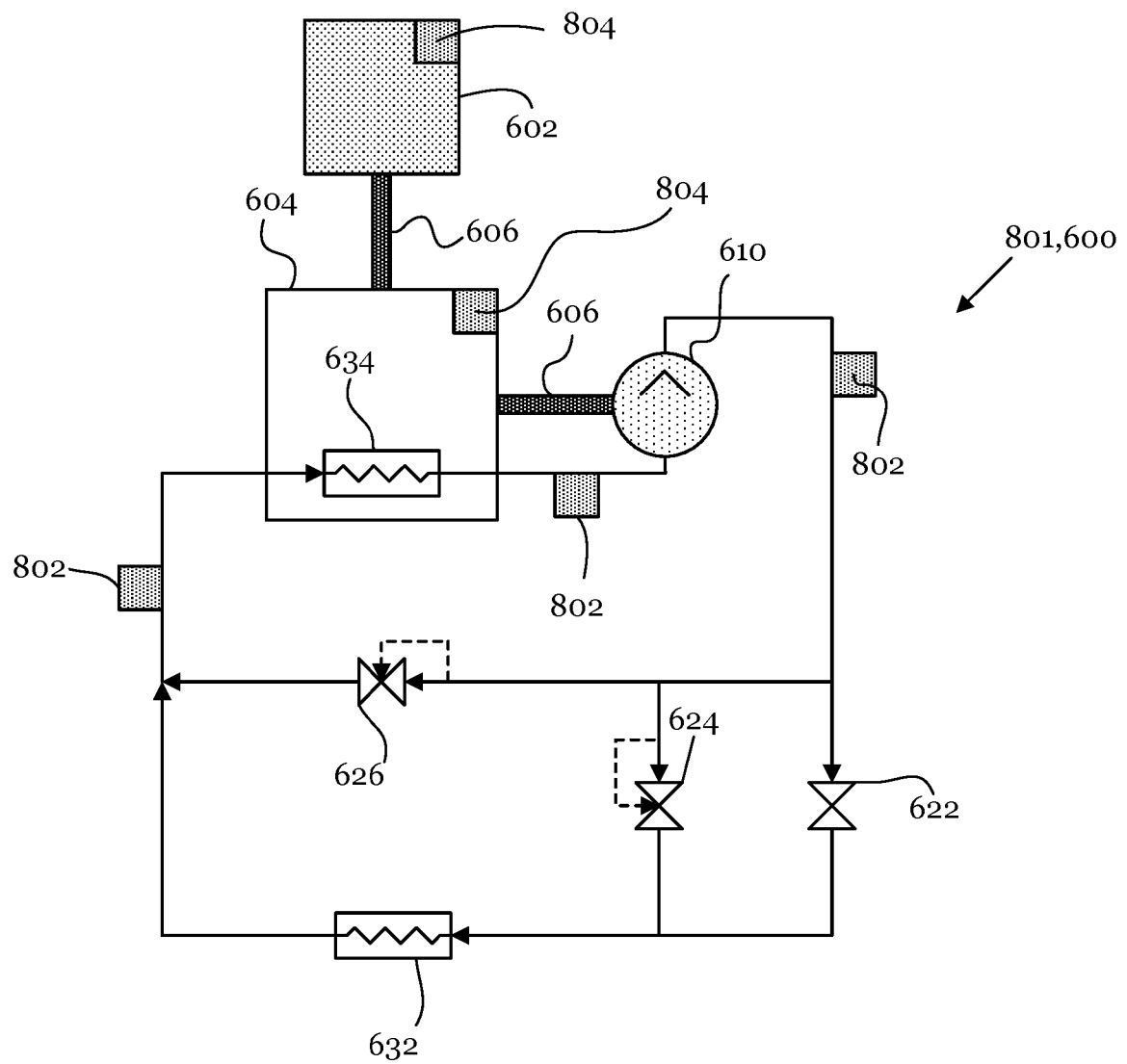
FIGS. 2A and 2B schematically show various embodiments of an exemplary fluid system.
Figure 2B:
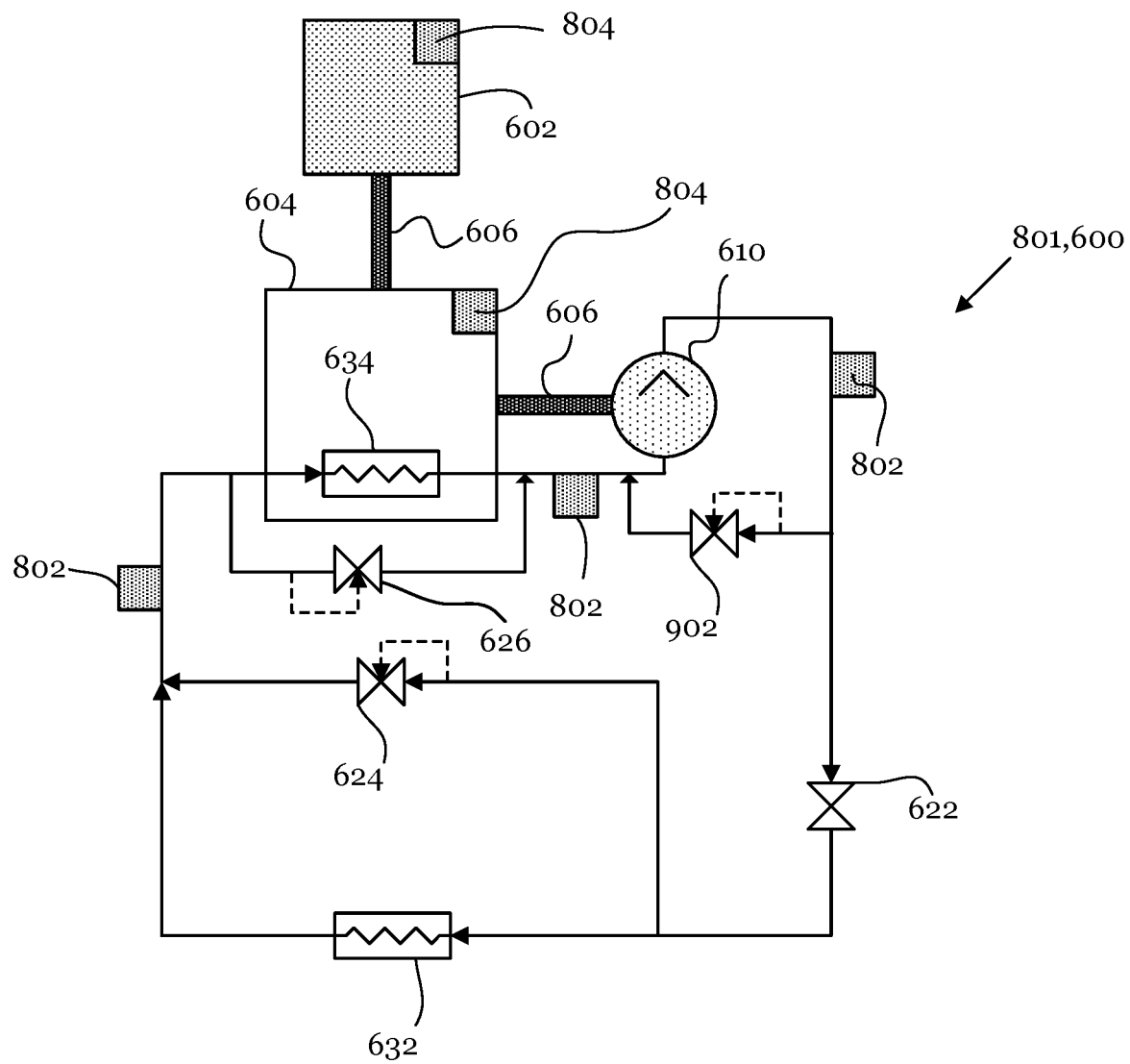
Figure 3A:
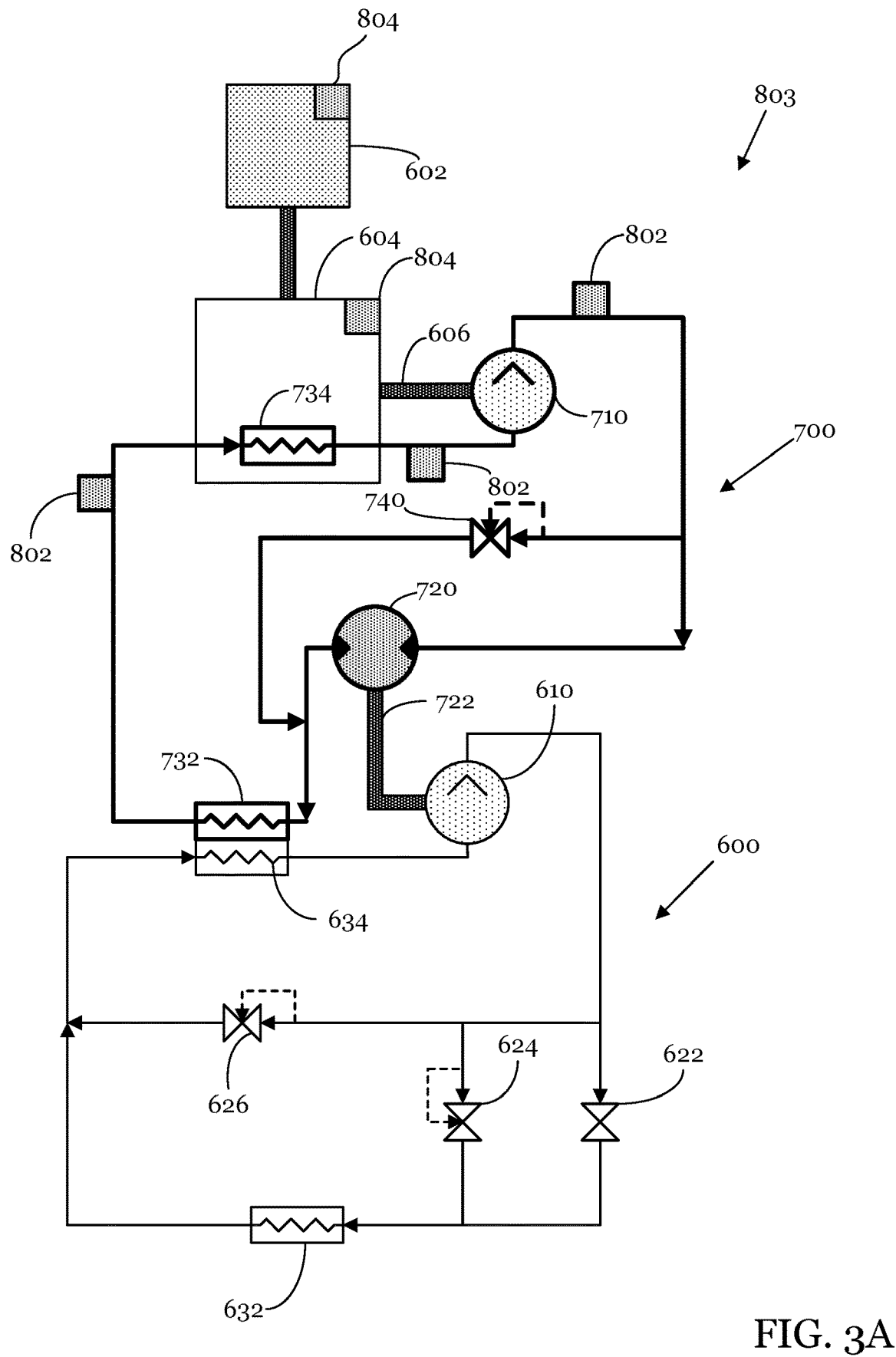
FIGS. 3A and 3B schematically show various embodiments of an exemplary fluid system.

FIGS. 2A and 2B present first fluid system 801, which can include a first fluid circuit 600. Pump 610 of first fluid system 801 can be directly mechanically coupled with mainshaft 22 or fan shaft 24. In the embodiment of FIG. 3, pump 610 of first fluid circuit 600 in second fluid system 803 can be indirectly coupled with mainshaft 22 or fan shaft 24 through an intermediate second fluid circuit 700. Any description of first fluid circuit 600 in relation to FIG. 2 can apply to the embodiment of first fluid circuit 600 shown in any other Figure and vise-versa.

As shown in FIGS. 2A and 2B, a first rotational component 602 can be mechanically coupled to a second rotational component 604 via shaft 606. Second rotational component 604 can be coupled to a fluid pump 610 via shaft 606. Shaft 606 can be representative of mainshaft 22 or fan shaft 24. As previously discussed, shaft 606 can be representative of a shaft assembly with a plurality of discrete shafts joined through gearboxes.

In any of the embodiments disclosed herein, first rotational component 602 be a source of mechanical power (e.g., gas turbine 100 or second electric machine 400). Second rotational component 604 can operate as a consumer of mechanical power (e.g., first electric machine 200 or fan 500). Alternatively, first rotational component 602 can be a consumer of mechanical power (e.g., first electric machine 200 or fan 500) and second rotational component 604 can be a source of mechanical power (e.g., gas turbine 100 or second electric machine 400).

Fluid pump 610 can be configured to drive a fluid through first fluid circuit 600. Fluid pump 610 can be a liquid pump or a gas compressor. Fluid pump 610 can motivate the fluid toward first, second, and third valves 622, 624, 626. First valve 622 can be a gate valve configured to either be in an open state or a closed state. First valve 622 can be a variable opening valve. In FIG. 2, the line segments extending between hydraulic components indicate fluid flow lines (e.g., pipes). The arrows show flow direction.

Second and third valves 624, 626 can be over-pressure relief valves (i.e., pressure regulating valves). The dotted fluid lines extending toward a third entrance of second and third valves 624, 626 indicate that second and third valves 624, 626 can be mechanically controlled via a diaphragm responsive to directly upstream fluid pressure. Fourth valve 902 can be an over-pressure relief valve or pressure regulating valve. Any and all of valves 622, 624, 626, 902 (discussed below) can be electronically controlled by a processing system 90 (further discussed below) responsive to directly upstream and/or directly downstream pressure measurements.

According to some embodiments, first valve 622 is mechanically controlled. For example, first valve 622 can be mechanically configured to fully or partially close from a fully open state in response to flow rate of fluid through first valve 622 exceeding a predetermined setpoint. Alternatively, or in addition, first valve 622 can be mechanically configured to fully or partially close from a fully open state in response to pressure of fluid directly upstream of first valve 622 exceeding a predetermined setpoint. For example, if the pump 610 is a positive displacement pump and goes into an overspeed condition, the flow rate and pump downstream pressure will increase.

According to some embodiments, first valve 622 is an electronically actuated gate valve, second valve 624 is an electronically controlled pressure control valve, and third valve 626 is a mechanically controlled pressure relief valve. According to some embodiments, first valve 622 is absent and the functionality of first valve 622 is replicated through control of second valve 624.

First heat exchanger 632 is positioned downstream of first and/or second valves 622, 624. First heat exchanger 632 can perform a cooling function by causing heat transfer between the fluid and an external fluid (not shown), which can be, for example, ambient air or working fluid in another fluid circuit. Third valve 626 passes the fluid to a point downstream of first heat exchanger 632 and upstream of a second heat exchanger 634.

Second heat exchanger 634 can be configured to transfer heat from second rotational component 604 (e.g., first electric machine 200 or second electric machine 400) to the fluid. Although not shown, second heat exchanger 634 can be isolated from second rotational component and in a cooling relationship with any component (e.g., intermediate circuitry 300, a gearbox for first or second shafts 22, 24, etc.). Fluid can return to fluid pump 610 from second heat exchanger 634. Although not shown, other components such as fluid accumulators can be disposed in first fluid circuit 600, which can be used to maintain fluid pressure and accommodate expansion/contract of fluid.

According to some embodiments (not shown), first heat exchanger 632 can transfer heat into the fluid and second heat exchanger 634 can remove heat from the fluid. Thus, first heat exchanger 632 can be disposed in second rotational component 604, in order to cool second rotational component 604, and second heat exchanger 634 can be configured to reject heat into an external working fluid. In these embodiments, first and second heat exchangers 632, 634 can keep their hydraulic positions shown in FIG. 2A within first fluid circuit 600 (i.e., first heat exchanger can still be directly downstream of first and second valve 622, 624 and third valve 626 can be configured to deposit fluid at a point upstream of first heat exchanger 632 as shown in FIG. 2A).

FIG. 2B shows various modifications that can be made to first fluid circuit 600. As shown in FIG. 2A, the outlet of second valve 624 can lead to a point downstream of first heat exchanger 632. Third valve 626 can be disposed in a line bypassing second heat exchanger 634. A first supplemental valve 902 can be disposed in a bypass line connecting the outlet of first pump 610 with the inlet of first pump 610.

As previously discussed, first fluid system 801 can exist in multiple different states (also called modes). Processing system ("PS") 90 can control the state of first fluid circuit 600 by controlling one or more (e.g., some or all) of pump 610 and valves 622, 624, 626, 902. PS 90 can do so based on sensors 802. Each sensor 802 can include a pressure sensor, a temperature sensor, and/or a flow rate sensor.

In a first operating state (further discussed below), first valve 622 can be fully open to reduce pressure directly downstream of pump 610 and thereby minimize the torque and/or power required from pump 610 to motivate fluid through first fluid circuit 600. In a second operating state (further discussed below), first valve 622 can be closed to raise pressure directly downstream of pump 610 and thereby increase the torque and/or power pump 610 requires to motivate fluid through first fluid circuit 600. As a result of the pressure increase, the second operating state can cause pump 610 to apply a significantly higher braking load to first rotational component 602, second rotational component 604, and shaft 606.

The increase in torque can be derived from the following equations:

For a hydraulic pump with incompressible fluid the pump input power=volumetric flow rate*pressure across the pump/pump efficiency, therefore, pump torque=volumetric flow rate*pressure across pump/pump efficiency/ pump speed.

For a positive displacement pump the volumetric flow rate=pump displacement*pump speed− pump leakage.

Neglecting pump leakage: pump torque=pump displacement*pressure across pump/pump efficiency First Operating State of First Fluid System.

First valve 622 can be open. In the embodiment of FIG. 2A, second and third valves 624, 626 can be closed. In the embodiment of FIG. 2B, second, third, and first supplemental valves 624, 626, 902 can open and close as needed to relieve pressure. Fluid can loop through fluid pump 610, first valve 622, first heat exchanger 632, and second heat exchanger 634.

During the first operating state, PS 90 can maintain pressure directly downstream of pump 610 at a first pump downstream pressure setting (e.g., an operating range). PS 90 can maintain pressure differential across fluid pump 610 at a first pump differential pressure setting by, for example, controlling the flow rate of fluid in first fluid circuit 600 with first valve 622.

PS 90 can control first fluid system 801 such that the torque required by pump 610 and/or the rotational energy consumed by pump 610 is/are less than the available torque supplied and/or the available rotational energy supplied by the mechanical power source (whether first rotational component 602 or second rotational component 604). PS 90 can control first fluid system 801 based on a temperature of second rotational component 604 (or whichever component second heat exchanger 634 is intended to cool).

Second Operating State of First Fluid System.

PS 90 can raise fluid pressure at a point directly downstream of first fluid pump 610. PS 90 can do so by partially or fully closing first valve 622. In the embodiment of FIG. 2A, PS 90 can fully or partially close first valve 622 and prevent an overpressure condition at the outlet of first pump 610 with pressure relief through second and third valves 624, 626. In the embodiment of FIG. 2B, PS 90 can fully or partially close first valve 622 and prevent overpressure at the outlet of first pump 610 with pressure relief through first supplemental valve 902. In some embodiments, PS 90 can modulate the opening of first valve 622 to provide overpressure relief.

PS 90 can open and close (i.e., modulate) the above-discussed valves to maintain (a) a second pump downstream pressure setting, and/or (b) a second pump differential pressure setting. As with all pressure settings discussed herein, the settings can be mechanically programmed into the above-discussed valves with, for example, a diaphragm and spring instead of being applied through PS 90.

The second pump differential pressure setting can be greater than the first pump differential pressure setting. The second pump downstream pressure setting can be greater than the first pump downstream pressure setting. PS 90 can control first fluid system 801 such that the torque delivered by pump 610 and/or the rotational energy consumed by pump 610 is/are greater than the torque supplied and/or the rotational energy supplied by the mechanical power source (whether first rotational component 602 or second rotational component 604). Thus, the system can act as a brake.

PS 90 can control first fluid system 801 (i.e., first fluid system 801 can be configured) such that immediately after transitioning to the second state, the torque required by pump 610 and/or the rotational energy consumed by pump 610 increases while the cooling capacity of first fluid system 801 decreases. For the reasons previously discussed, closing first valve 622 can immediately increase the torque and/or rotational energy required by pump 610 to motivate the fluid through first fluid circuit 600. If the torque and/or rotational energy required by pump 610 exceeds the torque and/or rotational energy available from the first or second rotational component 602, 604, then pump 610 can decelerate (i.e., brake) shaft 606 and thereby decelerate first and second rotational components 602, 604. Put differently, closing first valve 622 can cause first fluid circuit 600 to decelerate (i.e., brake) mainshaft 22 (when pump 610 is part of FEM fluid system 692 as shown in FIG. 1A) or decelerate fan shaft 24 (when pump 610 is an aspect of SEM fluid circuit 694 as shown in FIG. 1B).

According to some embodiments, PS 90 can be configured to rapidly alternate first fluid system 801 between the first and second operating states at a predetermined frequency. This operation can cause first fluid system 801 to apply a decelerating braking load in pulses, while enabling cooling fluid flow through second heat exchanger 634 between the pulses. PS 90 can be configured to stop supplying rotational power to first and/or second rotational component 602, 604 in parallel with transitioning to the second operating state. For example, PS 90 can be configured to stop supplying electrical power and/or fuel to the first rotational component 602 after receiving a command to decelerate the second rotational component 604.

Figure 3B:
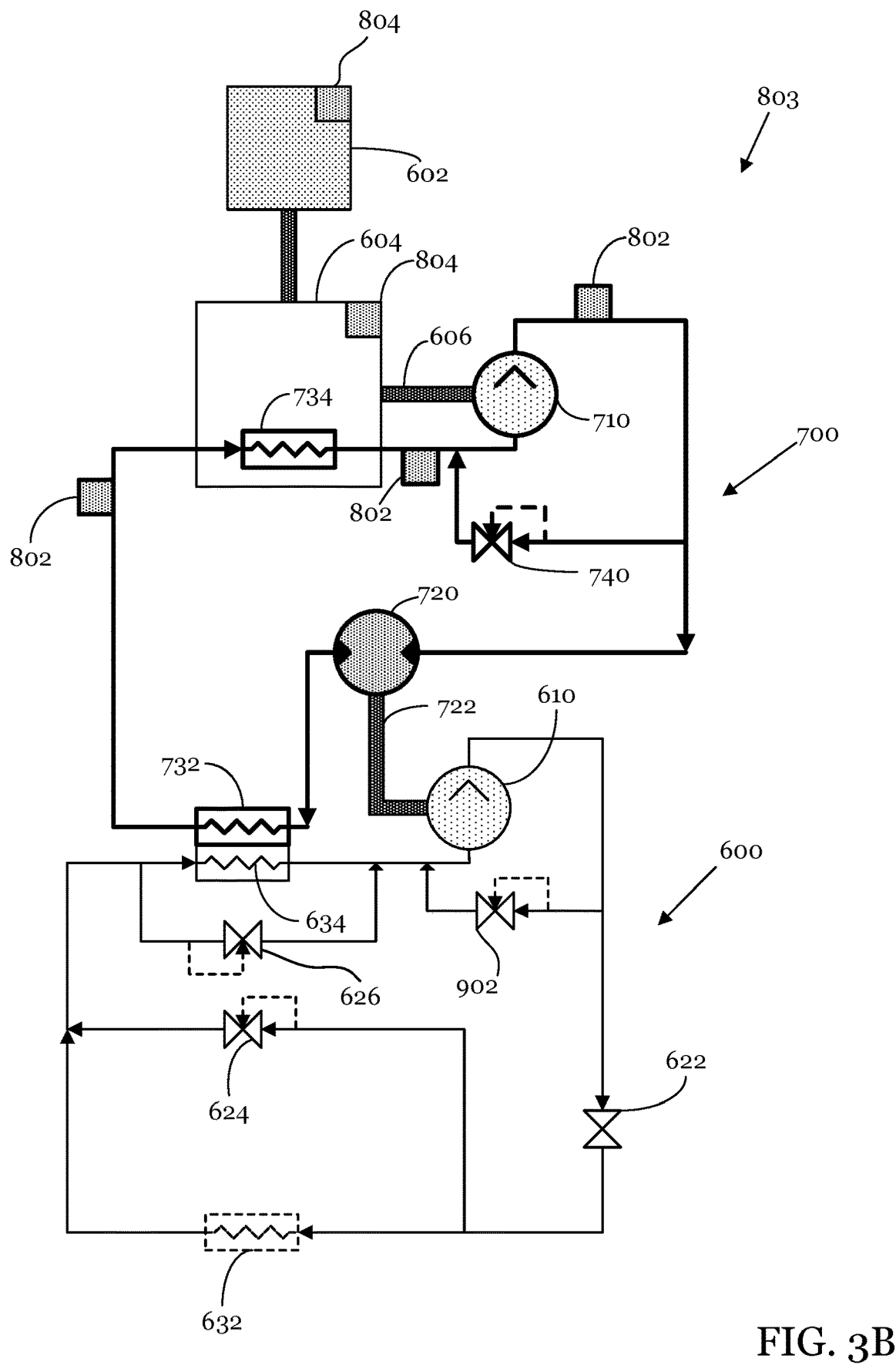

Referring to FIGS. 3A and 3B, first fluid circuit 600 can be indirectly coupled to shaft 606 via a second fluid circuit 700 to form a second fluid system 803. Fluid circulating in first fluid circuit 600 can be non-flammable (e.g., water based) while fluid circuiting in second fluid circuit 700 can be flammable (e.g., oil-based). Second fluid circuit 700 can include a second pump 710, a hydraulic motor 720, a third heat exchanger 732, a fourth heat exchanger 734, and a fourth valve 740.

Second fluid pump 710 can be mechanically coupled with shaft 606, as previously discussed with reference first fluid pump 610 in the embodiment of FIG. 2A. Pressurized fluid flowing through circuit 700 can actuate hydraulic motor 720, which can drive first fluid pump 610 with shaft 722. For the reasons discussed above, shaft 722 can represent a shaft assembly including one or more discrete shafts connected with speed reduction gearboxes.

Third heat exchanger 732 can cool fluid in second fluid circuit 700. As shown in FIG. 3A, third heat exchanger 732 can reject heat into second heat exchanger 634. Fourth heat exchanger 734 can perform the same function as second heat exchanger 634 in the embodiment of FIG. 2A.

Fourth valve 740 can operate as a bypass to relieve pressure directly downstream of second pump 710. Fourth valve 740 can be electronically controlled by PS 90 or mechanically controlled by, for example, a diaphragm in fluid communication with upstream fluid (as indicated with broken lines). FIG. 3A shows fourth valve bypassing hydraulic motor 720. FIG. 3B shows fourth valve 740 forming a bypass connecting the outlet of second pump 710 to the inlet of second pump 710. Although not shown, sensors 802 can be disposed along first fluid circuit 600 as in FIG. 2A.

According to some embodiments (not shown), third heat exchanger 732 is disposed directly downstream of fourth heat exchanger 734 and/or first heat exchanger 632 is disposed directly downstream of second heat exchanger 634. System 803 can otherwise be configured as previously discussed (e.g., second and third heat exchangers 634, 732 can still be in a direct thermal transfer relationship).

A check valve (not shown) can be disposed directly upstream of first fluid pump 610 and/or second fluid pump 710 to discourage backflow of high pressure fluid toward second heat exchanger 634 and/or fourth heat exchanger 734. As such, second heat exchanger 634 can have a maximum pressure rating less than the pressure developed directly downstream of first pump 610 and/or fourth heat exchanger 734 can have a maximum pressure rating less than the pressure developed directly downstream of second pump 710. A bypass line with a bypass valve can be provided about any heat exchanger disclosed herein.

An accumulator, such as a fluid tank, (not shown) can be disposed at any point in first and/or second fluid circuits 600, 700. For example, an accumulator can be disposed upstream of pumps 610, 710 to discourage pump cavitation. An accumulator can be added directly downstream of pumps 610, 710 to slow changes in pump outlet pressure.

First Operating State of Second Fluid System.

First fluid circuit 600 can be in the above-discussed first operating state wherein first valve 622 is fully open, enabling fluid circulation between first pump 610, first valve 622, first heat exchanger 632, and second heat exchanger 634.

With respect to second fluid circuit 700, fourth valve 740 can be closed. Fluid can circulate between second pump 710, hydraulic motor 720, third heat exchanger 732, and fourth heat exchanger 734. Fluid in first fluid circuit 600 can chill fluid in second fluid circuit 700 through second and third heat exchangers 634, 732. Fluid in second fluid circuit 700 can chill second rotating component 604 through fourth heat exchanger 734. Similar to second heat exchanger 634 in the embodiment of FIG. 2A, fourth heat exchanger 734 can be in a direct heat transfer relationship with any component disclosed herein including first rotational component 602.

Second Operating State of Second Fluid System.

First fluid circuit 600 can be in the above-discussed second operating state. Therefore, first valve 622 can be closed to raise the pressure directly downstream of first pump 610. As a result, first pump 610 can apply increased braking loads to hydraulic motor 720 via shaft 722.

Fourth valve 740 can be closed. As a result, the pressure directly downstream of second pump 710 can increase, causing second pump 710 to apply increased braking loads to the first and second rotational components 602, 604 via shaft 606. Fourth valve 740 can be configured to open and close (e.g., PS 90 can be configured to cause fourth valve 740 to open and close or fourth valve 740 can be mechanically configured to do so) to maintain pressure directly downstream of second pump 710 below a predetermined level.

As previously discussed, PS 90 can cause first/second fluid systems 801, 803 to switch between first and second operating states. PS 90 can switch between operating states based on receiving a command to decelerate (i.e., a command to brake) first rotational component 602, second rotational component 604, and/or shaft 606. PS 90 can internally generate the command (e.g., the command can automatically result from a sensor measurement). To capture relevant metrics, PS 90 can rely on first sensors 802, which can include pressure, temperature, and/or flow rate sensors. Alternatively, or in addition, PS 90 can rely on second sensors 804, which can include temperature, voltage, current, and/or rotational speed sensors.

For example, PS 90 can monitor a rotational speed of shaft 606 (i.e., first and/or second shafts 22, 24). If the rotational speed of shaft 606 exceeds a predetermined value, then PS 90 can enter the second operating state (i.e., cause first fluid circuit 600/fluid system 801 to enter the second operating state). According to some embodiments, PS 90 can use fluid pressure in first and/or second fluid circuits 600, 803 as a proxy for shaft rotational speed. Therefore, according to some embodiments, PS 90 a pressure above a predetermined quantity in first and/or second fluid circuit 600, 803 can trigger the second operating state. According to some embodiments, PS 90 can rely on fluid pressure measured directly downstream of first pump 610.

When entering the second operating state, PS 90 can determine a desired deceleration of shaft 606, then control first fluid system 801 and second fluid system 803 based on the desired shaft deceleration. For example, PS 90 can control the fluid systems 801, 803 to produce a desired (i.e., predetermined) fluid pressure directly downstream of first fluid pump 610 and/or second fluid pump 710. The predetermined fluid pressure can be based on the desired shaft deceleration (e.g., based on a desired shaft rotational speed and a current shaft rotational speed).

PS 90 can enter the second operating state in response to detecting aerodynamic wind-milling states. A wind-milling state can occur when an aircraft is in an off-state (e.g., parked on a runway), but wind is causing fan 500 to rotate. A wind-milling state can occur in-flight after the power has been shutoff to first and/or second electric machine 200, 400. The power shutoff can be caused by, for example, a short-circuit.

PS 90 can enter the second operating state in response to determining or as a precaution against heat generated internal to electric machines 200 or 400 by a short circuit due to voltages induced by windmilling rotation, for example after a shutdown due to a short circuit failure. By applying braking and hence decelerating the machines to reduce or stop the rotational speed the internal machine short circuit currents can be reduced or eliminated. PS 90 can enter the second operating state in response to an engine shutdown command (e.g., a command to turn off gas turbine 100). The engine shutdown command can be an electrical signal originating, for example, at a user interface (e.g., controls in an aircraft cockpit). Alternatively, or in addition, PS 90 can determine that an engine shutdown has occurred by measuring rotational speed of shaft 606.

PS90 can enter the second operating state in response to a shutdown of the prime mover or electric machine caused by a failure. This includes shutdown commanded due to failures that result in electric machine, gas turbine or other rotor overspeeds.

PS90 can enter the second state operating state in response to an electric machine, gas turbine or other rotor overspeed condition to apply additional braking torque to slow the speed or reduce the acceleration rate.

PS 90 can enter the second operating state based on an electric metric of first electric machine 200. For example, PS 90 can enter the second operating state based on determining that first electric machine 200 is supplying an excessive amount of electrical voltage (i.e., to prevent an electrical isolation failure). To do so, PS 90 can (a) determine (e.g., estimate) the amount of electrical voltage supplied by first electric machine 200 and if this is above a predetermined limit then PS 90 can enter the second operating state to decelerate first electric machine 200.

Figure 4:
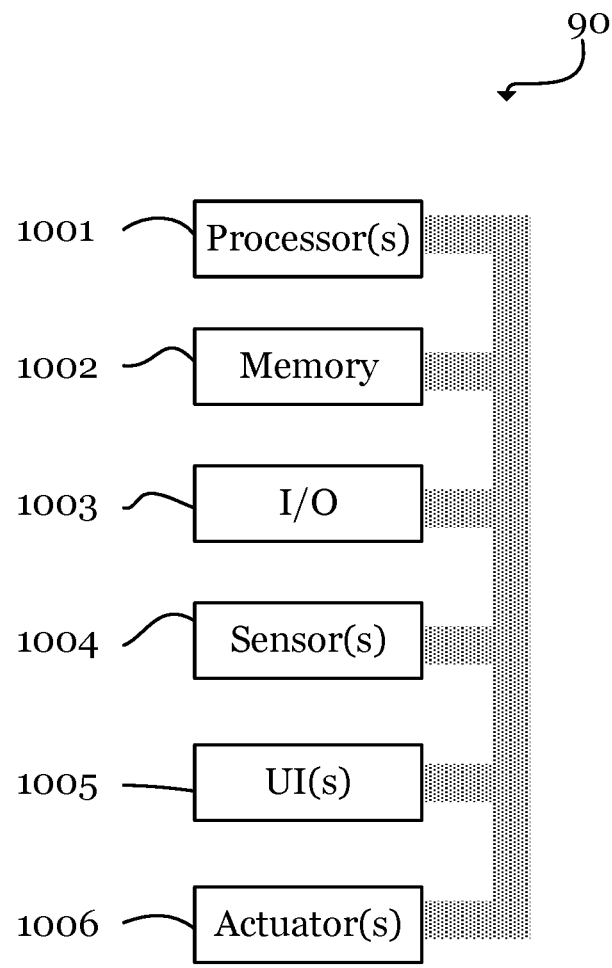
FIG. 4 is a block diagram of an exemplary processing system.

Referring to FIG. 4, system 10 and/or fluid systems 801, 803 can include processing system ("PS") 90. Referring to FIG. 4, PS 90 can include one or more processors 1001, memory 1002, one or more input/output devices 1003, one or more sensors 1004, one or more user interfaces 1005, and one or more actuators 1006.

Processors 1001 can include one or more distinct processors, each having one or more cores. Each of the distinct processors can have the same or different structure. Processors 1001 can include one or more central processing units (CPUs), one or more graphics processing units (GPUs), circuitry (e.g., application specific integrated circuits (ASICs)) or FPGA, digital signal processors (DSPs), and the like. Processors 1001 can be mounted on a common substrate or to different substrates.

Processors 1001 are configured to perform a certain function, method, or operation at least when one of the one or more of the distinct processors is capable of executing code, stored on memory 1002 embodying the function, method, or operation. Processors 1001 can be configured to perform any and all functions, methods, and operations disclosed herein.

For example, when the present disclosure states that PS 90 performs/can perform task "X", such a statement should be understood to disclose that PS 90 can be configured to perform task "X". Mobile device 100 and PS 90 are configured to perform a function, method, or operation at least when processors 1001 are configured to do the same.

Memory 1002 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 1002 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 1002.

Input-output devices 1003 can include any component for trafficking data such as ports, antennas (i.e., transceivers), printed conductive paths, and the like. Input-output devices 1003 can enable wired communication via USB®, DisplayPort®, HDMI®, Ethernet, and the like. Input-output devices 1003 can enable electronic, optical, magnetic, and holographic, communication with suitable memory 1003. Input-output devices 1003 can enable wireless communication via WiFi®, Bluetooth®, NFC®, cellular (e.g., LTE®, CDMA®, GSM®, WiMax®), GPS and the like. Input-output devices 1003 can include wired and/or wireless communication pathways.

Sensors 1004 can capture physical measurements of environment and report the same to processors 1001. Examples of sensors 1004 include rotational sensors, pressure sensors, temperature sensors, flow rate sensors, which can be disposed at any (e.g., every) point in the cooling circuit diagrams. Sensors 1004 can include first and second sensors 802, 804. User interface 1005 can include a display (e.g., LED touchscreens (e.g., OLED touchscreens), physical buttons, speakers, microphones, keyboards, and the like.

Actuators 1006 can enable processors 1001 to control mechanical forces. For example, actuators can be electronically controllable motors disposed in pumps and valves. Every valve and pump discussed herein can be independently controllable by PS 90. PS 90 can be configured to control the rate of fuel injection through combustor 120, and thus the rotational speed of mainshaft 22. PS 90 can be configured to control intermediate circuitry 300, first electric machine 200 and/or second electric machine 400.

PS 90 can be distributed. For example, some elements of PS 90 can be disposed inside an aircraft body while other elements of PS 90 can be disposed in drive assembly 10. PS 90 can have a modular design where certain features have a plurality of the aspects shown in FIG. 4. For example, I/O modules can include volatile memory and one or more processors.

I claim:

1. A system comprising:
    a rotational component, a shaft, and a fluid pump comprising a pump outlet, the rotational component comprising a first electric machine, the shaft transferring rotational power toward the fluid pump;
    a fluid circuit comprising a valve and the fluid pump, the pump being configured to motivate a fluid toward the valve, the valve being disposed downstream of the pump;
    the system being configured to raise a fluid pressure at the pump outlet by closing the valve; and
    a processing system configured to receive a command to increase a hydraulic braking load to the rotational component and close the valve to raise the fluid pressure at the pump outlet based on a braking command.

2. The system of claim 1, wherein the fluid circuit comprises a heat exchanger configured to transfer heat between the rotational component and the fluid, the pump being configured to motivate the fluid through the heat exchanger, the valve being disposed between the pump outlet and the heat exchanger.

3. The system of claim 2, wherein the fluid circuit is a first fluid circuit and the system comprises a second fluid circuit, the second fluid circuit comprising a pump mechanically coupled with the shaft and a hydraulic motor mechanically coupled with the pump of the first fluid circuit.

4. The system of claim 3, wherein the second fluid circuit comprises a pressure relief valve disposed along a fluid line bypassing the hydraulic motor.

5. The system of claim 1, wherein the fluid circuit comprises a first heat exchanger and a second heat exchanger, the first heat exchanger configured to cool the fluid, the second heat exchanger configured to heat the fluid.

6. The system of claim 5, wherein the fluid circuit comprises an independent bypass line and pressure relief valve at each of the heat exchangers.

7. The system of claim 6, wherein the system is configured to restrict fluid flow through the fluid circuit to increase pressure at the pump outlet by closing the valve.

8. The system of claim 1, wherein the first electric machine is mechanically coupled to a gas turbine engine, the processing system being configured to capture a metric of the first electric machine and to control the valve based on the metric.

9. The system of claim 1, wherein the valve is a first valve, the system comprising a second valve disposed in a bypass line directly connecting a pump inlet with the pump outlet;
    the pump being a positive displacement pump configured such that fluid flow is proportional to a speed of the pump; and
    the system comprising an accumulator disposed in the fluid circuit to regulate pressure.

10. The system of claim 1, wherein the pump is a positive displacement pump configured such that fluid flow is proportional to a speed of the pump.

11. The system of claim 1 comprising an accumulator disposed in the fluid circuit to regulate pressure.

12. In a rotational system comprising a rotational component coupled to a fluid pump of a fluid circuit via a shaft, a method comprising:
    coupling the fluid pump to apply a braking load to the shaft in relation to a pressure of a fluid in the fluid circuit; and
    at least partially closing a valve to thereby raise the pressure of the fluid within the fluid circuit to effect an increase in the braking load applied to the shaft based on detecting an electrical or mechanical failure.

13. The method of claim 12 comprising closing the valve to increase the pressure of the fluid within the fluid circuit based on a rotational speed of the rotational component and/or the shaft.

14. The method of claim 12, wherein the rotational component is an electric machine configured to operate as an electric motor and/or as an electric generator.

15. The method of claim 12, wherein the fluid circuit is in thermal communication with the rotational component via a heat exchanger.

16. The method of claim 12 comprising closing the valve to increase fluid pressure within the fluid circuit to a predetermined pressure setpoint.

17. A method of decelerating a rotational component in a system, the system comprising:
    the rotational component, the rotational component comprising an electric machine, a shaft, and a fluid pump comprising a pump outlet, the shaft transferring rotational energy toward the fluid pump;
    a fluid circuit comprising a valve and the fluid pump, the pump being configured to motivate fluid toward the valve, the valve being disposed downstream of the pump;
    the method comprising closing the valve to increase fluid pressure at the pump outlet based on a receiving a command to decelerate the rotational component;
    capturing a metric of the electric machine, wherein the metric is electric current or voltage; and
    closing the valve based on detecting an electrical failure.

18. The method of claim 17, wherein the fluid circuit is a first fluid circuit and the system comprises a second fluid circuit, the second fluid circuit comprising a pump mechanically coupled with the shaft and a hydraulic motor mechanically coupled with the pump of the first fluid circuit.

* * * * *